Feb. 13, 1934. C. H. DAVIS, JR Re. 19,083

CIRCUIT BREAKER LEVER

Original Filed July 11, 1930

INVENTOR
Charles H. Davis Jr. Deceased
BY DELCO-REMY CORPORATION
ASSIGNEE
BY Spencer Hardman and Fehr
ITS ATTORNEYS Reissued Feb. 13, 1934 Re. 19,083

UNITED STATES PATENT OFFICE 19,083

CIRCUIT BREAKER LEVER

Charles Hall Davis, Jr., deceased, late of Anderson, Ind., by Delco-Remy Corporation, Anderson, Ind., assignee Original No. 1,851,568, dated March 29, 1932, Serial No. 467,254, July 11, 1930. Application for reissue May 6, 1933. Serial No. 669,655

47 Claims. (Cl. 200—30)

This invention relates to ignition apparatus and particularly to improvements in circuit breakers and the operating parts thereof.

One object of the invention is to provide a pivoted lever having relatively small inertia of rotation so as to provide a circuit breaker that is capable of high speed operation.

A further object of the invention is to provide a circuit breaker lever constructed from a minimum number of parts.

A further object of the invention is to provide a circuit breaker that is capable of manufacture from strip material, with the fewest possible number of operations.

A further object of the invention is to provide means for securely retaining a pivot bushing in a circuit breaker lever.

Further objects and advantages of the present invention will be apparent from the following description, reference being had to the accompanying drawing wherein a preferred embodiment of one form of the present invention is clearly shown.

Figure 1:
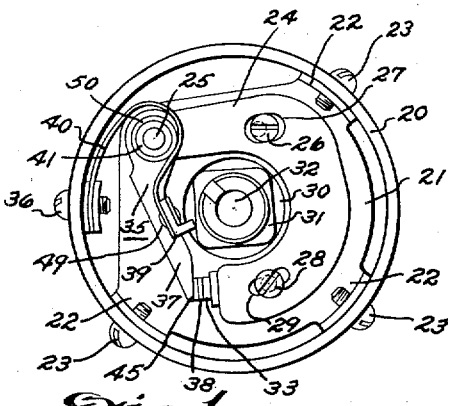
Fig. 1 is a plan view of an ignition device including a preferred form of the instant invention.

With particular reference to the drawing, 20 indicates a housing, which in the present instance may be a timer cup supporting a circuit breaker mounting plate 21, by ears 22 secured to the housing with attaching screws 23 or other preferred devices. Adjustably mounted on the plate 21 is a bracket 24 pivotally movable about a pivot post 25, through the agency of an eccentric screw 26 retained by the plate 21 with its head disposed in a slot 27 of the bracket 24, and the bracket is held in its adjusted position about the post 25 by means of a clamping screw 28 passing through a slot 29 and being threaded in the plate 21. The plate 21 is centrally apertured at 30 to allow for the passage of a cam 31 maintained in driving relation upon a shaft or spindle 32, all as is the usual structure, and such as is desired for the periodic operation of a circuit breaker lever.

Pivotally and insulatingly mounted on the pivot post 25 is a circuit breaker lever assembly 35 that is in cooperable engagement with the rotatable cam 31 provided by the shaft, and operates to alternately open and close electrical circuits through the device, and to transmit the circuit functions to a terminal post 36 provided by the casing 20. In the preferred form of the instant invention, the details thereof are illustrated in Figs. 1 to 8 inclusive, and are characterized in that the circuit breaker lever assembly 35 comprises a circuit breaker lever 37 carrying a contact point 38 for cooperation with a fixed point 33 on the bracket 24, a rubbing block 39 cooperable with the cam 31 for actuating the lever 37, and having a leaf spring 40 attached thereto, which when secured within the housing 20 operates to oscillate the lever 37 with its pivot bushing 41 about the post 25 whereby circuits are alternately opened and closed through the points 33 and 38.

Figure 3:
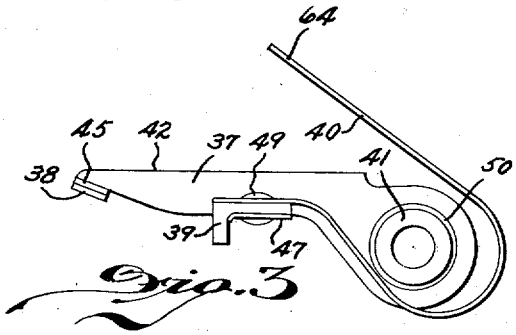
Fig. 3 is a plan view of the assembly seen in Fig. 2.
Figure 4:
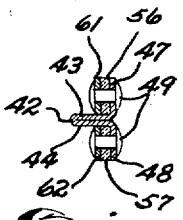
Fig. 4 is a transverse sectional view, substantially as illustrated by the line and arrows 4—4 of Fig. 2.
Figure 5:
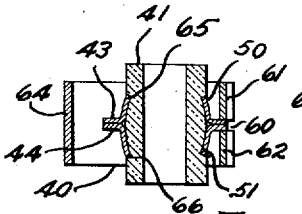
Fig. 5 is a transverse sectional view substantially as indicated by the line and arrows 5—5 of Fig. 2.

The lever 37 is formed or otherwise fabricated from a piece of strip material, preferably of steel or other hard metal to include a longitudinal fold or doubling over along the medial line to form a rigid back as at 42, and so as to provide contiguous laminations or leaves 43 and 44 extending in planes of right angles to the axis of rotation of the lever. At the free end of the lever 37 and along the free edges of the laminations thereof, there are provided oppositely extending lugs or flanges 45 and 46 located in the same plane. To these flanges the contact point 38 is welded or otherwise secured. At an intermediate point other oppositely extending lugs or flanges 47 or 48 located in the same plane are provided; and these flanges provide a means for attaching to the lever 37 the rubbing block 39 and one end of the circuit breaker lever urging spring 40, by the rivets 49 as illustrated in Figs. 3 and 4. At the pivoted end of the lever, the laminations 43 and 44 are provided with sleeve-like flanges or extensions 50 and 51 adapted to receive and retain the pivot bushing 41 herein-before referred to, and which will be described in detail in paragraphs that follow.

It will be observed in the form of the circuit breaker lever assembly illustrated in Figs. 1 to 8, that the flanges 47 and 48, and the attached end of the spring 40 operates as clamping members between which one arm of the L-shaped rubbing block 39 is secured; and that the rivets 49 pressing against the attached end of the spring 40 and against the flanges 47 and 48 operate as to clamp the spring and the flange to block 39. This assembly provides a compact grouping of the elements of the structure, whereby the transverse dimensions are reduced to a minimum, enabling the use of a smaller enclosing mechanism such as the casing 20, or for an enlargement of such operating mechanism as the cam 31, and at the same time avoiding crowding of other parts of the structure necessary and incident to the device and usually enclosed within the casing 20.

Figure 6:
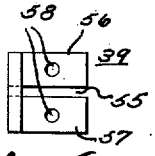
Fig. 6 and Fig. 7 are detailed views of a rubbing block forming part of the circuit breaker lever assembly in one of the illustrated forms.
Figure 7:
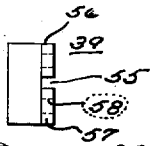
Figure 8:
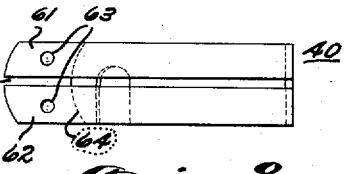
Fig. 8 is a side elevational view of a circuit breaker lever spring.

To accomplish this compact formation, the rubbing block 39 is especially formed as is illustrated in Figs. 6 and 7, and the operating spring 40 is especially formed as is illustrated in Fig. 8. In the instance of the rubbing block, the attaching arm thereof is slit as at 55 to provide the parallel portions 56 and 57 that carry apertures 58 and provide for a close coupling with the attaching flanges 47 and 48 as will presently appear. The spring 40 is slit as at 60 for a portion of its length along its medial line so as to provide the substantially parallel extending arms 61 and 62 provided with apertures 63. The slit 55 of the rubbing block, as well as the slit 60 of the spring, receive the body of the lever 37 therein, as illustrated so that the portions 56 and 57 of the rubbing block and the arms 61 and 62 of the spring may overlay a portion of the arm and may be disposed behind the attaching flanges 47 and 48 respectively. When the parts are thus disposed and properly aligned, they provide for the reception of the attaching rivets 49 as has been described and as is illustrated in Fig. 4.

As has been illustrated, the spring 40, after its attachment to the flanges 47 and 48, bends outwardly and is in substance wrapped about the pivot portion of the lever where it engages the sleeve-like flanges 50 and 51 secured about the pivot bushing, and thence terminates in an attaching portion 64 for making mechanical and electrical connection with the terminal screw 36 as earlier described. Aside from forming bearing portions for the spring 40, the flanges 50 and 51 operate to receive a bushing 41 as earlier stated and also to firmly retain the bushing therein. When the bushing 41 is of dielectric material, then the lever 37 is well insulated from its supporting structure. The provisions for the retention of the bushing within the aligned sleeves 50 and 51 include peripheral grooves 65 and 66 about the bushing within which are disposed the flanges 50 and 51 respectively after the bushing has been assembled therewith. Flanges 50 and 51 are axially knurled on their inner periphery before bushing 41 is pressed therein to prevent bushing from rotating or oscillating with respect to flanges 50 and 51. The means of retention is fully illustrated in the transverse sectional view of Fig. 5, and is accomplished by initially forming the flanges 50 and 51 of cylindrical contour, and of sufficient size to allow the passage of the bushing 41 therethrough. After the bushing 41 has been properly placed within the sleeve-like flanges, it is retained therein by depressing the free edges of the said flanges into the recesses 65 and 66 by means of a hollow tool or other instrument suitable for the purpose. This causes the edges of the flanges to seat within the grooves 65 and 66, and the knurls of the sleeves to bite into the body of the bushing and prevent relative rotation.

Figure 9:
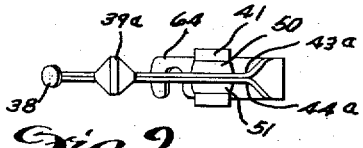
Figs. 9 and 10 are side elevational and plan views respectively of a modified form of circuit breaker lever.
Figure 10:
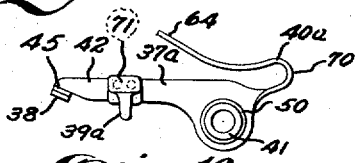
Figure 2:
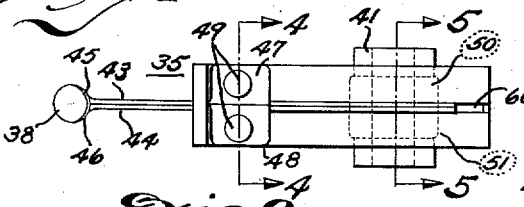
Fig. 2 is an enlarged view in side elevation of an improved circuit breaker lever assembly.

A second form of circuit breaker assembly is illustrated in Figs. 9 and 10, and is essentially the same as the form just described in that a rigid lever portion 37*a* is formed by folding the blank along the back 42 as in the preceding form, and providing the free edges thereof with the lugs 45 and 46 for supporting a contact 38, and the sleeve like flanges 50 and 51 for mounting the pivot bushing 41. In the form illustrated in Figs. 9 and 10, the blank of material is extended to include a flat portion to provide an integrally jointed spring member 40*a* manifesting in a resilient loop 70 joining the attaching end 64 with the laminations 43*a* and 44*a* as illustrated. This type of arm may have a rubbing block similar to the one shown in either Fig. 3 or in Fig. 12, in which case flanges and rivets are provided for its attachment. However, the rubbing block illustrated with this form of circuit breaker lever assembly, is of molded form 39*a* and provides an attaching portion 71 for disposition about or otherwise engaging the body of the lever 37*a* retaining it thereon against movement in any desired manner. In practice two countersinks are provided to secure moulded rubbing blocks on the arm, but apertures in the arm, or ribs will answer the same purpose.

Figure 11:
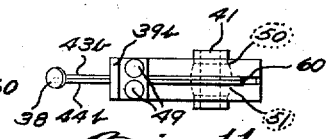
Figs. 11 and 12 are side elevational and plan views respectively of a third form of circuit breaker lever.
Figure 12:
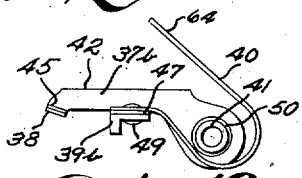

A third form of circuit breaker lever assembly is illustrated in Figs. 11 and 12, and comprises essentially the same parts as illustrated in the first form with the possible exception of the final formation of the rubbing block preparing it for attachment to the attaching flanges. While the plan view illustrated in Fig. 12, is in detail slightly different in configuration from the form illustrated in Fig. 3, the lever member 37*b* of the one form or the lever member 37 of the other form respectively, may be inter-changed with each of the parts associated with the other without deviating from the invention herein disclosed. The essential difference between these two forms being in the manner and order of attaching the rubbing block and spring member to the lever member. In the third form illustrated the laminations 43*b* and 44*b* are provided with, the flanges 45, 46 for mounting of the contact, the flanges 47, 48 to which are secured the spring 40 and the rubbing block 39*b*, and the sleeve-like flanges 50 and 51 within which is secured the pivot bushing 41 as has been described in each of the other forms.

The rubbing block 39*b* mounted upon the flanges 47, 48 need not be slit as in the instance of the first described form, since the rubbing block in this instance is secured to the lever in front of the attaching flanges 47 and 48, which in other words disposes it entirely between the operating cam 31 and the attaching flanges carried by the lever. In this instance the spring 40 is slit as at 60 and is assembled on the back side of the attaching flanges 47 and 48, being disposed in overlying relation with respect to the arm 37*b* substantially as described in the preferred form, retention of the rubbing block and spring in firm relation with the flanges 47 and 48 being obtained by the rivets 49 as has been elsewhere described. This forms a circuit breaker lever assembly of greater transverse magnitude than that of the first form, and one that is adaptable to certain forms of construction that would not necessitate the use of a form as illustrated in Figs. 1 to 8 inclusive.

It will be observed by the above disclosure, that a circuit breaker lever assembly has been provided that is of light weight, that is of rigid construction and that is easy of manufacture, requiring a minimum of constructional operations. The result is the production of a circuit breaker lever assembly for high speed operation that is highly efficient and that can be produced at relatively low cost. The pivot bushing is securely retained within the arm in a manner that securely insulates the lever upon its supporting structure and properly spaces the same therefrom. The bushing cannot work loose from the arm and this eliminates the wear usually attendant upon the portions of this structure that ordinarily give rise to inaccurate timing of ignition due to lost motion occurring from the wear. All of this produces quieter operation and higher speed operation. In the event of any fault arising in the lever assembly, the entire unit may be replaced with a new one operating in perfect order at an inconsequential cost.

While the form of embodiment of the present invention as herein disclosed, constitutes a preferred form, it is to be understood that other forms might be adopted, all coming within the scope of the claims which follow.

What is claimed is as follows:

1. A circuit breaker lever comprising, in combination, two juxtaposed plates located in planes at right angles to the axis of oscillation of the lever and provided respectively with oppositely extending integral annular flanges surrounding aligned holes, a bushing retained within both annular flanges, a rubbing block secured to both plates, and a contact secured to both plates.

2. A circuit breaker lever comprising, in combination, two juxtaposed plates located in planes at right angles to the axis of oscillation of the lever and provided respectively with oppositely extending, integral flanges located in the same plane parallel to the axis of the lever, a rubbing block secured to both flanges, a bearing carried by the plates, and a contact secured to both plates.

3. A circuit breaker lever comprising, in combination, two juxtaposed plates located in planes at right angles to the axis of oscillation of the lever and provided respectively with oppositely extending, integral flanges located in the same plane parallel to the axis of the lever, a rubbing block secured to both flanges, a leaf spring secured to both flanges, a bearing carried by the plates, and a contact secured to both plates.

4. A circuit breaker lever comprising, in combination, two juxtaposed plates located in planes at right angles to the axis of oscillation of the lever and provided respectively with oppositely extending, integral flanges located in the same plane parallel to the axis of the lever and provided respectively with oppositely extending integral annular flanges surrounding aligned holes, a bushing retained within both annular flanges, a rubbing block secured to both plates, a contact secured to both plane flanges of the plates, and a rubbing block secured to the plates.

5. A circuit breaker lever comprising, in combination, two juxtaposed plates located in planes at right angles to the axis of oscillation of the lever and provided respectively with pairs of oppositely extending, integral flanges, each pair of flanges being in a plane parallel to the axis of the lever, a rubbing block secured to one pair of said flanges, a contact secured to another pair of said flanges, and a bearing carried by said plates.

6. A circuit breaker lever comprising, in combination, two juxtaposed plates located in planes at right angles to the axis of oscillation of the lever and provided respectively with pairs of oppositely extending, integral flanges, each pair of flanges being in a plane parallel to the axis of the lever, and provided respectively with oppositely extending, integral annular flanges surrounding aligned holes, a bushing retained within both annular flanges, a rubbing block secured to one pair of plane flanges, and a contact secured to another pair of plane flanges.

7. In an ignition device, a circuit breaker lever formed from strip material to provide a contact supporting lever of laminated form, flanges provided at one end of said lever and supporting a contact point, means intermediate the ends of said lever and a rubbing block secured thereto, sleeve like flanges disposed at the other end of said lever, a bushing disposed therein, said bushing providing recesses receiving said flanges, and means for urging the lever for rotation about the axis of the bushing.

8. In an ignition device, a circuit breaker lever formed from strip material to provide a contact supporting lever of laminated form, a contact, a rubbing block and a leaf spring secured to said lever, and oppositely extending sleeve-like flanges coaxially disposed near one end of said lever, and a bushing secured within the sleeve-like members with the terminating edges of said sleeves received by annular grooves provided by said bushing.

9. In an ignition device, a circuit breaker lever therefor, comprising in combination, sleeve-like flanges provided at one end thereof, a bushing disposed within said flanges and provided with recesses, the terminating edge of said flanges being depressed into said recesses for securing the bushing to the lever.

10. A laminated circuit breaker lever comprising in combination, a pair of contiguous laminations carrying right and left hand flanges respectively, said laminations being secured together to present the flanges in sets or pairs, said lever providing a pair of flanges at each end thereof and a third pair intermediate its ends, a contact point secured to the flanges at one end of the lever and a pivot bushing secured to the flanges at the opposite end thereof, a rubbing block and a leaf spring both secured to the intermediate pair of said flanges.

11. A circuit breaker lever comprising a single sheet metal stamping shaped so as to provide two juxtaposed plates located in planes at right angles to the axis of oscillation of the lever and provided, respectively, with oppositely extending, integral, annular flanges surrounding aligned holes, a bushing retained within both annular flanges, a rubbing block secured to both plates, and a contact secured to both plates.

12. A circuit breaker lever comprising a single sheet metal stamping shaped so as to provide two juxtaposed plates located in planes at right angles to the axis of oscillation of the lever and provided, respectively, with oppositely extending, integral, annular flanges surrounding aligned holes, and shaped so as to provide a leaf spring portion integral with said plates, a bushing retained within both annular flanges, a rubbing block secured to both plates, and a contact secured to both plates.

13. A circuit breaker lever comprising a single sheet metal stamping shaped so as to provide two juxtaposed plates located in planes at right angles to the axis of oscillation of the lever and provided, respectively, with oppositely extending, integral, annular flanges surrounding aligned holes, and shaped so as to provide oppositely extending, integral flanges located in the same plane, parallel to the axis of the lever, a bushing retained within both annular flanges, a rubbing block secured to both plane flanges, and a contact secured to both plates.

14. A circuit breaker lever comprising a single sheet metal stamping shaped so as to provide two juxtaposed plates located in planes at the right angles to the axis of oscillation of the lever and provided, respectively with oppositely extending, integral, annular flanges surrounding aligned holes, and shaped so as to provide two pairs of oppositely extending, integral flanges, each pair of flanges being in a plane at right angles to the axis of the lever, a bushing retained within both annular flanges, a rubbing block secured to one pair of plane flanges, and a contact secured to the other pair of plane flanges.

15. A circuit breaker lever comprising, in combination, a flat plate, a pivot member and a contact member secured to the plate, a leaf spring providing an opening therein for receiving a portion of the plate, a rubbing block having a notch therein for receiving a portion of the plate, the interfitting of the plate with the spring and rubbing block limiting lateral displacement of the spring and rubbing block relative to the plane of the plate, and means for securing the rubbing block and leaf spring to the plate.

16. A circuit breaker lever comprising, in combination, a flat plate, a pivot member and a contact member secured to the plate, the axis of the pivot member being substantially at right angles to the plane of the plate, a leaf spring having its longer cross-sectional dimension located substantially at right angles to the plane of the plate, a rubbing block having a cam-contacting-face extending substantially at right angles to the plane of the plate, and means for securing the spring and rubbing block to the plate.

17. A circuit breaker lever comprising, in combination, a flat plate, a pivot member and a contact member secured to the plate, the axis of the pivot member being substantially at right angles to the plane of the plate, a leaf spring having its longer cross-sectional dimension located substantially at right angles to the plane of the plate, a rubbing block having a cam-contacting-face extending substantially at right angles to the plane of the plate, and common means extending through both the rubbing block and spring and extending longitudinally of the plane of the plate for securing the spring and rubbing block to the plate.

18. A circuit breaker lever comprising, in combination, a flat plate, a pivot member and a contact member secured to the plate, the axis of the pivot member being substantially at right angles to the plane of the plate, a leaf spring having its longer cross-sectional dimension located substantially at right angles to the plane of the plate, a rubbing block having a cam-contacting-face extending substantially at right angles to the plane of the plate, said spring and rubbing block having openings or notches for receiving a portion of the plate whereby to limit lateral displacement of the spring and rubbing block relative to the plane of the plate, and common means extending through both the rubbing block and spring and extending longitudinally of the plane of the plate for securing the spring and rubbing block to the plate.

19. A circuit breaker lever comprising, in combination, a flat plate, a pivot member and a contact member secured to the plate, the axis of the pivot member being substantially at right angles to the plane of the plate, a leaf spring having its longer cross-sectional dimension located substantially at right angles to the plane of the plate, a rubbing block having a cam-contacting-face extending substantially at right angles to the plane of the plate, said spring and rubbing block having openings or notches in alignment for receiving a common portion of the plate whereby to limit lateral displacement of the spring and rubbing block relative to the plane of the plate, and means for securing the rubbing block and spring to the plate.

20. A circuit breaker lever comprising, in combination, a flat plate, a pivot member and a contact member secured to the plate, the axis of the pivot member being substantially at right angles to the plane of the plate, a leaf spring having its longer cross-sectional dimensions located substantially at right angles to the plane of the plate, a rubbing block having a cam-contacting-face extending substantially at right angles to the plane of the plate, said spring and rubbing block having openings or notches in alignment for receiving a common portion of the plate, whereby to limit lateral displacement of the spring and rubbing block relative to the plane of the plate, and common means extending through both the rubbing block and spring and extending longitudinally of the plane of the plate for securing the spring and rubbing block to the plate.

21. A circuit breaker lever comprising, in combination, a flat plate, a pivot member and a contact member secured to the plate, the axis of the pivot member being substantially at right angles to the plane of the plate, a leaf spring having its longer cross-sectional dimensions located substantially at right angles to the plane of the plate, a rubbing block having a cam-contacting-face extending substantially at right angles to the plane of the plate, and means for securing the spring and rubbing block to the plate, said means including a member extending at right angles to the plane of the plate, the rubbing block and spring being located against said securing member, and said securing means including a member extending through both the spring and rubbing block and extending longitudinally of the plane of the plate.

22. A circuit breaker lever comprising, in combination, a flat plate, a pivot member and a contact member secured to the plate, the axis of the pivot member being substantially at right angles to the plane of the plate, a leaf spring having its longer cross-sectional dimensions located substantially at right angles to the plane of the plate, a rubbing block having a cam-contacting-face extending substantially at right angles to the plane of the plate, said spring and rubbing block having openings or notches in alignment for receiving a common portion of the plate whereby to limit lateral displacement of the spring and rubbing block relative to the plane of the plate, and means for securing the spring and rubbing block to the plate, said means including a member extending at right angles to the plane of the plate, the rubbing block and spring being located against said securing member, and said securing means including a member extending through both the spring and rubbing block and extending longitudinally of the plane of the plate.

23. A circuit breaker lever comprising, in combination, a flat plate, a pivot member and a contact member secured to the plate, the axis of the pivot member being substantially at right angles to the plane of the plate, a leaf spring having its longer cross-sectional dimensions located substantially at right angles to the plane of the plate, a rubbing block having a cam-contacting-face extending substantially at right angles to the plane of the plate, flanges extending from the bar at right angles to the plane thereof, and rivets extending through the spring, rubbing block and flanges for securing the spring and rubbing block to the flanges.

24. A circuit breaker lever comprising, in combination, a flat plate, a pivot member and a contact member secured to the plate, the axis of the pivot member being substantially at right angles to the plane of the plate, a leaf spring having its longer cross-sectional dimensions located substantially at right angles to the plane of the plate, a rubbing block having a cam-contacting-face extending substantially at right angles to the plane of the plate, said spring and rubbing block having openings or notches in alignment for receiving a common portion of the plate whereby to limit lateral displacement of the spring and rubbing block relative to the plane of the plate, flanges extending from the bar at right angles to the plane thereof, and rivets extending through the spring, rubbing block and flanges for securing the spring and rubbing block to the flanges.

25. A circuit breaker lever comprising, in combination, a flat plate, a pivot member extending through the plate and beyond both sides thereof, and annular parts extending from both sides of the plate and closely fitting about the pivot member.

26. A circuit breaker lever comprising, in combination, a flat plate, a pivot member extending through the plate and disposed substantially symmetrically with respect to the sides of the plate, and means for holding the pivot member so that its axis will be substantially at right angles to the plane of the plate.

27. A circuit breaker lever comprising, in combination a flat plate, a rubbing block having a cam-contacting face extending substantially at right angles to the plane of the plate and disposed substantially symmetrically with respect to the plane of the plate, and means for securing the rubbing block to the plate.

28. A circuit breaker lever comprising, in combination, a flat plate, a pivot member secured to the plate with the axis of the pivot member extending substantially at right angles to the plane of the plate, and a rubbing block secured to the plate with its cam-contacting face substantially parallel to the axis of the pivot member, said pivot member and said rubbing block both extending through the plane of the plate and located substantially symmetrically with respect to the plate.

29. A circuit breaker lever comprising, in combination, a flat plate of two juxtaposed laminations, a pivot member and a contact secured to said plate, a rubbing block having a cam-engaging surface extending laterally beyond either side of the plate, and means for securing the rubbing block to each lamination whereby the rubbing block ties the two laminations together and increases the rigidity of the plate.

30. A circuit breaker lever comprising, in combination, a flat plate of two juxtaposed laminations, a pivot member and a contact secured to said plate, a rubbing block having a cam-engaging surface extending laterally beyond either side of the plate, flanges integral with the laminations and extending laterally therefrom in opposite directions, and means for securing the rubbing block to both of said flanges whereby the rubbing block ties the two laminations together and increases the rigidity of the plate.

31. A circuit breaker lever comprising, in combination, a flat plate of two juxtaposed laminations, a pivot member and a contact secured to said plate, a rubbing block having a cam-engaging surface extending laterally beyond either side of the plate, said rubbing block having a notch therein within which notch portions of both laminations snugly fit, and means for securing the rubbing block to each lamination whereby the rubbing block ties the two laminations together and increases the rigidity of the plate.

32. A circuit breaker lever comprising, in combination, a flat plate of two juxtaposed laminations, a pivot member and a contact secured to said plate, a rubbing block having a cam-engaging surface extending laterally beyond either side of the plate, said rubbing block having a notch therein within which notch portions of both laminations snugly fit, flanges integral with the laminations and extending laterally therefrom in opposite directions, and means for securing the rubbing block to both of said flanges whereby the rubbing block ties the two laminations together and increases the rigidity of the plate.

33. A circuit breaker lever comprising, in combination, a flat plate of two juxtaposed laminations, a contact and a rubbing block attached to the plate, a pivot member passing through both laminations, and means for attaching the pivot member to both laminations whereby the pivot member ties the two laminations together and increases the rigidity of the plate.

34. A circuit breaker lever comprising, in combination, a flat plate of two juxtaposed laminations, a contact and a rubbing block attached to the plate, a pivot member passing through both laminations, and annular flanges integral with the laminations and extending laterally therefrom in opposite directions and tightly fitting around said pivot member whereby the pivot member ties the two laminations together and increases the rigidity of the plate.

35. A circuit breaker lever comprising, in combination, a flat plate of two juxtaposed laminations, a contact secured to the plate, a pivot member and a rubbing block both extending laterally from both sides of the plate, means for securing the pivot member to both laminations and means for securing the rubbing block to both laminations whereby the two laminations are tied together by the pivot member and the rubbing block and the rigidity of the plate is increased.

36. A circuit breaker lever comprising, in combination, a flat plate of two juxtaposed laminations, a pivot member and a contact both extending laterally from both sides of the plate, a rubbing block secured to the plate, means for securing the pivot member to both laminations and means for securing the contact to both laminations whereby the two laminations are tied together by the pivot member and the contact and the rigidity of the plate is increased.

37. A circuit breaker lever comprising, in combination, a flat plate of two juxtaposed laminations, a pivot member and a rubbing block and a contact each extending laterally from both sides of the plate, and separate devices respectively for securing the pivot member, the rubbing block and the contact to both laminations whereby the two laminations are tied together and the rigidity of the plate is increased.

38. A circuit breaker lever comprising in combination, a flat plate, a pivot member and a contact attached thereto, an L-shaped rubbing block extending laterally beyond both sides of the plate, one leg of said rubbing block providing a cam-engaging surface at one end thereof, and means for attaching the other leg of the rubbing block to the plate.

39. A circuit breaker lever comprising in combination, a flat plate, a pivot member and a contact attached thereto, an L-shaped rubbing block extending laterally beyond both sides of the plate, one leg of said rubbing block providing a cam-engaging surface at one end thereof, a part extending from the plate at right angles to the plane thereof and means extending longitudinally of the plane of the plate for securing the other leg of the rubbing block to the plate.

40. A circuit breaker lever comprising in combination, a flat plate, a pivot member and a contact attached thereto, an L-shaped rubbing block extending laterally beyond both sides of the plate, one leg of said rubbing block providing a cam-engaging surface at one end thereof, flanges extending from either side of the plate and at right angles to the plane thereof and means for securing the other leg of the rubbing block to the plate.

41. A circuit breaker lever comprising in combination, a flat plate, a pivot member and a contact attached thereto, an L-shaped rubbing block extending laterally beyond both sides of the plate, one leg of said rubbing block providing a cam-engaging surface at one end thereof, the other leg of the rubbing block being notched to receive a portion of the plate, and means for securing said notched leg to said plate and including a part extending from said portion of said plate laterally with respect to the plane of the plate.

42. A circuit breaker lever comprising in combination, a flat plate, a pivot member and a contact attached thereto, an L-shaped rubbing block extending laterally beyond both sides of the plate, one leg of said rubbing block providing a cam-engaging surface at one end thereof, the other leg of the rubbing block being notched to receive a portion of the plate, flanges extending from said portion of said plate and from either side of the plate and at right angles to the plane thereof, and means for securing said notched leg to said flanges.

43. A circuit breaker lever comprising, in combination, a flat plate, a pivot member and a contact attached to the plate, a leaf spring and an L-shaped rubbing block both extending laterally beyond both sides of the flat plate, the angle-edge of the rubbing block and the longer cross-sectional dimension of the leaf spring both extending substantially at right angles to the plane of the plate, and common means for securing one end of the leaf spring and one leg of the rubbing block to the plate.

44. A circuit breaker lever comprising, in combination, a flat plate, a pivot member and a contact attached to the plate, a leaf spring and an L-shaped rubbing block both extending laterally beyond both sides of the flat plate, the angle-edge of the rubbing block and the longer cross-sectional dimension of the leaf spring both extending substantially at right angles to the plane of the plate, and common means for securing one end of the leaf spring and one leg of the rubbing block to the plate, said means including a part extending from the plate at right angles to the plane thereof and a part extending longitudinally of the plane of the plate.

45. A circuit breaker lever comprising, in combination, a flat plate, a pivot member and a contact attached to the plate, a leaf spring and an L-shaped rubbing block both extending laterally beyond both sides of the flat plate, the angle-edge of the rubbing block and the longer cross-sectional dimension of the leaf spring both extending substantially at right angles to the plane of the plate, and common means for securing one end of the leaf spring and one leg of the rubbing block to the plate, said means including flanges extending laterally from the plate from each side thereof and rivets extending longitudinally of the plane of the plate and passing through the flanges, rubbing block and spring.

46. A circuit breaker lever comprising, in combination, a flat plate, a pivot member and a contact attached to the plate, a leaf spring and an L-shaped rubbing block both extending laterally beyond both sides of the flat plate, the angle-edge of the rubbing block and the longer cross-sectional dimension of the leaf spring both extending substantially at right angles to the plane of the plate, one end of the spring and one leg of the L-shaped rubbing block being notched to receive a portion of the plate, and means for securing said notched part of said spring and said notched leg of the rubbing block to said plate, said means including a part extending from said portion of said plate laterally with respect to said plane of the plate.

47. A circuit breaker lever comprising, in combination, a flat plate, a pivot member and a contact attached to the plate, a leaf spring and an L-shaped rubbing block both extending laterally beyond both sides of the flat plate, the angle-edge of the rubbing block and the longer cross-sectional dimension of the leaf spring both extending substantially at right angles to the plane of the plate, one end of the spring and one leg of the L-shaped rubbing block being notched to receive a portion of the plate, and means for securing said notched leg and said notched spring part to said flanges.

DELCO-REMY CORPORATION,
*Assignee of Charles Hall Davis, Jr. (deceased),*
By F. C. KROEGER,
*President.*